US008266272B2

(12) United States Patent
Frietsch et al.

(10) Patent No.: US 8,266,272 B2
(45) Date of Patent: Sep. 11, 2012

(54) METHODS FOR IT NETWORK REPRESENTATION AND ASSOCIATED COMPUTER PROGRAM PRODUCTS

(75) Inventors: Thomas Frietsch, Lange Anwanden (DE); Traugott Marquardt, Herrenberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1550 days.

(21) Appl. No.: 11/267,287

(22) Filed: Nov. 7, 2005

(65) Prior Publication Data

US 2007/0106768 A1    May 10, 2007

(51) Int. Cl.
*G06F 15/173*    (2006.01)
*H04B 7/14*    (2006.01)

(52) U.S. Cl. ........................................ 709/224; 370/315
(58) Field of Classification Search ................... 709/224, 709/245, 223; 707/204
See application file for complete search history.

(56) References Cited

U.S. PATENT DOCUMENTS

| 4,045,799 | A  | * | 8/1977  | Dapiran ......................... 342/419 |
|-----------|----|---|---------|------------------------------------------|
| 4,095,054 | A  | * | 6/1978  | Anizan et al. ................. 379/272  |
| 5,185,860 | A  | * | 2/1993  | Wu ................................ 709/224 |
| 5,627,819 | A  | * | 5/1997  | Dev et al. ...................... 370/250 |
| 5,687,320 | A  | * | 11/1997 | Wiley et al. .................... 709/245 |
| 5,958,012 | A  | * | 9/1999  | Battat et al. .................... 709/224 |
| 6,088,730 | A  | * | 7/2000  | Kato et al. ..................... 709/227 |
| 6,182,136 | B1 | * | 1/2001  | Ramanathan et al. ........ 709/224 |
| 6,253,337 | B1 | * | 6/2001  | Maloney et al. ................ 714/38 |
| 6,269,447 | B1 | * | 7/2001  | Maloney et al. ................ 726/25 |
| 6,336,142 | B1 | * | 1/2002  | Kato et al. ..................... 709/227 |
| 6,549,208 | B2 | * | 4/2003  | Maloney et al. ............... 345/473 |
| 6,591,299 | B2 | * | 7/2003  | Riddle et al. .................. 709/224 |
| 6,654,802 | B1 | * | 11/2003 | Oliva et al. ..................... 709/224 |
| 6,700,586 | B1 | * | 3/2004  | Demers ......................... 345/588 |
| 6,894,653 | B2 | * | 5/2005  | Chiang et al. .................. 343/757 |
| 6,907,488 | B1 | * | 6/2005  | Diehl ............................ 710/305 |
| 6,944,939 | B2 | * | 9/2005  | Guo et al. ................... 29/603.15 |
| 6,978,314 | B2 | * | 12/2005 | Tarr ............................... 709/245 |
| 7,010,536 | B1 | * | 3/2006  | De Angelo .................... 707/100 |
| 7,088,824 | B1 | * | 8/2006  | Takeuchi ....................... 380/256 |
| 7,200,031 | B2 | * | 4/2007  | Liu et al. ....................... 365/154 |
| 7,225,356 | B2 | * | 5/2007  | Monitzer ........................ 714/12 |
| 7,277,936 | B2 | * | 10/2007 | Frietsch ......................... 709/223 |
| 7,286,538 | B2 | * | 10/2007 | Song et al. ..................... 370/392 |
| 7,293,080 | B1 | * | 11/2007 | Clemm et al. ................. 709/223 |
| 7,505,401 | B2 | * | 3/2009  | Kashyap ........................ 370/217 |
| 7,633,897 | B2 | * | 12/2009 | Bender et al. ................. 370/328 |
| 2001/0043217 | A1 | * | 11/2001 | Maloney et al. ............... 345/473 |
| 2003/0046390 | A1 | * | 3/2003  | Ball et al. ...................... 709/224 |
| 2003/0110253 | A1 | * | 6/2003  | Anuszczyk et al. .......... 709/224 |
| 2004/0057431 | A1 | * | 3/2004  | Song et al. ..................... 370/390 |
| 2004/0057727 | A1 | * | 3/2004  | Lim et al. ........................ 398/58 |
| 2004/0125036 | A1 | * | 7/2004  | Chiang et al. .................. 343/757 |
| 2004/0186903 | A1 | * | 9/2004  | Lambertz ....................... 709/224 |
| 2004/0199627 | A1 | * | 10/2004 | Frietsch ......................... 709/224 |
| 2005/0138517 | A1 | * | 6/2005  | Monitzer ........................ 714/746 |

(Continued)

*Primary Examiner* — Krisna Lim
*Assistant Examiner* — Margishi Desai

(57) ABSTRACT

A method of creating an IT-network representation including automatically discoverable active elements and not automatically discoverable, passive elements. A logical discoverable-elements representation of the IT network is produced, by running a network auto-discovery tool. The representation includes the automatically discoverable active elements and a discoverable-elements network topology. Representations of not automatically discoverable elements are manually inserted, by a user by means of a network-element editor, between automatically discovered elements into said discoverable-elements representation. Thereby a combined logical representation is created which models the IT network with its automatically discoverable elements and non automatically discoverable elements.

20 Claims, 15 Drawing Sheets

U.S. PATENT DOCUMENTS

| | | |
|---|---|---|
| 2007/0198609 A1* | 8/2007 | Black et al. .................. 707/204 |
| 2007/0226540 A1* | 9/2007 | Konieczny .................... 714/26 |
| 2007/0276733 A1* | 11/2007 | Geshwind et al. ............. 705/14 |
| 2008/0189405 A1* | 8/2008 | Zarenin et al. ............... 709/224 |

* cited by examiner

EDITOR

*Fig. 6*

RELATIONAL DATABASE SCHEME FOR AUTODISCOVERY INCORPORATING PHYSICAL LAYER INVENTORY

End_device: {[ id: integer, IP-address: integer, processor: string, manufacturer: string, admin_status: date]}

Switch: {[ id: integer, IP-address: integer, manufacturer: string, admin_status: date, response time: float]}

Router: {[ id: integer, IP-address: integer, manufacturer: string, admin_status: date, speed: float, RAM: integer, processor: string, routing type: string]}

Cable: {[ id: integer, location: string, manufacturer: string, type: string, diameter: float, length: float]}

Patchcable: {[ id: integer, location: string, manufacturer: string, type: string, diameter: float, length: float]}

Patchpanel: {[ id: integer, location: string, manufacturer: string, type: string, number_of_ports: integer, number_of_free_ports: integer]}

Active_Port: {[ device_id: integer, port_id: integer, type: string, occupied: boolean]}

Passive_Port: {[ patch_id: integer, port_id: integer, type: string, occupied: boolean]} is_connected_to: {[ device_id: integer, active_port_id: integer, patch_id: integer, cable_id: integer, passive_port_id: integer]} belongs_to: {[ patch_id: integer, port1_id: integer, port2_id: integer, connect_id: integer]} connects: {[ patch1_id: integer, port1_id: integer, patch2_id: integer, port2_id: integer, cable_id: integer]}

FIG. 7A

| END_DEVICE | | | | |
|---|---|---|---|---|
| ID | IP-ADDRESS | PROCESSOR | MANUFACTURER | ADMIN_STATUS |
| 1 | 15.1.192.3 | AMD ATHLON | HEWLETT-PACKARD | 30/10/2005, 13:17 |
| 2 | 15.139.142.158 | AMD ATHLON | HEWLETT-PACKARD | 29/10/2005, 19:40 |
| ... | ... | ... | ... | ... |

| SWITCH | | | | |
|---|---|---|---|---|
| ID | IP-ADDRESS | MANUFACTURER | ADMIN_STATUS | RESPONSE TIME |
| 3 | 15.1.191.5 | CISCO | 30/10/2005, 17:56 | 0.6 sec |
| 4 | 15.1.190.6 | CISCO | 30/10/2005, 12:55 | 0.1 sec |
| 5 | 15.1.192.5 | ... | ... | ... |
| 6 | ... | ... | | |
| 7 | ... | | | |
| 8 | | | | |
| 9 | | | | |
| 10 | | | | |

| ROUTER | | | | | | | |
|---|---|---|---|---|---|---|---|
| ID | IP-ADDR. | MANUF. | ADMIN-STATUS | SPEED | RAM | PROCESSOR | ROUTING TYPE |
| 11 | 15.1.152.6 | DELL | 30/10/2005 19:17 | 108 MBPS | ... | ... | ... |
| 12 | 15.1.152.7 | DELL | 30/10/2005 18:57 | ... | | | |
| 13 | ... | ... | ... | | | | |
| 14 | | | | | | | |

FIG. 7B

| CABLE | | | | | |
|---|---|---|---|---|---|
| ID | LOCATION | MANUFACTURER | TYPE | DIAMETER | LENGTH |
| 1 | A | CISCO | FIBRE OPTIC | 62,5μm | 10m |
| 2 | B | CISCO | FIBRE OPTIC | 62,5μm | 10m |
| 3 | A | CISCO | | | |
| 4 | B | ... | | | |
| 5 | A | ... | | | |
| 6 | A | ... | | | |
| 7 | ... | ... | | | |
| 8 | ... | ... | | | |

| PATCHCABLE | | | | | |
|---|---|---|---|---|---|
| ID | LOCATION | MANUFACTURER | TYPE | DIAMETER | LENGTH |
| 1 | A | BELKIN | FIBER OPTIC | 62,5μm | 5m |
| 2 | A | BELKIN | FIBER OPTIC | 62,5μm | 3m |
| 3 | A | BELKIN | | | |
| 4 | B | | | | |
| 5 | B | | | | |
| 6 | A | | | | |
| 7 | B | | | | |
| 8 | A | | | | |
| 9 | B | | | | |
| 10 | ... | | | | |
| 11 | ... | | | | |
| 12 | ... | | | | |
| 13 | ... | | | | |

FIG. 7C

| ACTIVE PORT | | | |
|---|---|---|---|
| DEVICE_ID | PORT_ID | TYPE | OCCUPIED |
| 11 | 8 | IN | YES |
| 12 | 7 | IN | YES |
| 13 | 9 | OUT | NO |
| ... | ... | ... | ... |

| IS_CONNECTED_TO | | | |
|---|---|---|---|
| DEVICE_ID | AC.PORT_ID | CABLE_ID | PASSIVE_PORT_ID |
| 3 | 8 | 19 | 27 |
| 4 | 9 | 28 | 12 |
| 5 | 10 | 37 | 8 |
| ... | ... | ... | ... |

| BELONGS_TO | | | |
|---|---|---|---|
| PATCH_ID | PORT1_ID | PORT2_ID | CONNECT_ID |
| 45 | 23 | 12 | 98 |
| 67 | 12 | ... | ... |
| ... | ... | | |

| CONNECTS | | | | |
|---|---|---|---|---|
| PATCH1_ID | PORT1_ID | PATCH2_ID | PORT2_ID | CABLE_ID |
| 23 | 67 | 78 | 12 | 25 |
| 78 | 90 | 25 | 10 | 30 |
| ... | ... | ... | ... | ... |

FIG. 7D

| PATCHPANEL | | | | |
|---|---|---|---|---|
| ID | LOCATION | MANUFACTURER | # PORTS | # FREE PORTS |
| 1 | A | CISCO | 68 | 14 |
| 2 | B | CISCO | ... | ... |
| 3 | A | ... | ... | ... |

| PASSIVE PORT | | | |
|---|---|---|---|
| PATCH ID | PORT ID | TYPE | OCCUPIED |
| 1 | 1 | IN | NO |
| 1 | 2 | IN | YES |
| 1 | 3 | IN | NO |
| 1 | 4 | IN | NO |
| 1 | 5 | IN | YES |
| 1 | 6 | IN | NO |
| 1 | 7 | IN | NO |
| 1 | 8 | IN | YES |
| 1 | 9 | IN | NO |
| 1 | 10 | IN | NO |
| 1 | 11 | OUT | NO |
| 1 | 12 | OUT | NO |
| 1 | 13 | OUT | YES |
| 1 | 14 | OUT | NO |
| 1 | 15 | OUT | YES |
| 1 | 16 | OUT | NO |
| 1 | 17 | OUT | YES |
| 1 | 18 | OUT | NO |
| 1 | 19 | OUT | NO |

Fig. 11

INCIDENT REPORT FOR TROUBLE TICKET SYSTEM

NETWORK FAIME DETECTED WHEN TRYING TO CONTACT IP ADRESS 15.2.192.6

DIAGNOSIS COMPONENT RECOMMENDS TO CHECK THE FOLLOWING NETWORK ELEMENTS.

ACTIVE NETWORK ELEMENTS:

| SWITCH | | | | |
|---|---|---|---|---|
| ID | IP-ADDRESS | MANUFACTURER | ADMIN_STATUS | RESPONSE_TIME |
| 10 | 15.2.192.6 | CISCO | 30/10/2005, 17:16 | 0.1sec |

PASSIVE NETWORK ELEMENTS:

| PATCHPANEL | | | | |
|---|---|---|---|---|
| ID | LOCATION | MANUFACTURER | # PORTS | # FREE PORTS |
| 13 | ROOM NR.45 | CISCO | 68 | 45 |
| 14 | ROOM NR.45 | CISCO | 68 | 40 |
| 15 | ROOM NR.45 | CISCO | 68 | 38 |

| PATCHCABLE | | | | | |
|---|---|---|---|---|---|
| ID | LOCATION | MANUFACTURER | TYPE | DIAMETER | LENGTH |
| 28 | ROOM NR.45 | BELKIN | FIBER OPTIC | 62.5 mµ | 3m |
| 35 | ROOM NR.45 | BELKIN | FIBER OPTIC | 62.5 mµ | 3m |
| 43 | ROOM NR.45 | BELKIN | FIBER OPTIC | 62.5 mµ | 3m |

| CABLE | | | | | |
|---|---|---|---|---|---|
| ID | LOCATION | MANUFACTURER | TYPE | DIAMETER | LENGTH |
| 12 | ROOM NR.45 | BELKIN | FIBER OPTIC | 62.5 mµ | 10m |
| 67 | ROOM NR.45 | BELKIN | FIBER OPTIC | 62.5 mµ | 20m |
| 90 | ROOM NR.45 | BELKIN | FIBER OPTIC | 62.5 mµ | 20m |

METHODS FOR IT NETWORK REPRESENTATION AND ASSOCIATED COMPUTER PROGRAM PRODUCTS

FIELD OF THE INVENTION

The present invention relates generally to Information Technology (IT) network representation, and for example to methods and computer program products for creating an IT-network representation including automatically discoverable active elements and not automatically discoverable, that is passive, elements, and to methods and computer program products for performing fault analysis based on such a representation.

BACKGROUND OF THE INVENTION

Nowadays, as information systems become ubiquitous and companies and organizations of all sectors become more and more dependent on their computing resources, the requirement for the availability of the hardware and software components of the IT networks, and of services based on them, is increasing while the complexity of the IT networks is growing. An IT network normally has a diversity of elements, such as interconnect devices (routers, switches, hubs, patchpanels, cables/fiber optics, etc.) and end devices (servers, workstations, PCs, storage devices, printers, etc.). There is a desire to detect, and quickly rectify, malfunctions of the network elements. Since companies have the constant task of adapting the IT network to their daily needs, IT networks are not static systems but are dynamically growing and changing. The philosophy on which Ethernet and internet technologies are based is the absence of any central administration which would have to be actively notified about intended modifications to the IT network, and which would then permit, or refuse, such modification requests. Indeed, modern networks have a considerable ability to organize themselves, which allows network elements to be simply added, changed, or removed, within certain limits, without a need to notify a superordinate administrative instance, or the like. Although this was introduced to render IT networks more robust against failures and changes, the downside of it is that, since adding, changing or removing a network element is not directly "punished", such modifications will often be made without authorization, or even awareness, by a superordinate instance. Consequently, in practice, such networks often exhibit considerable "change dynamics".

In order to cope with the dynamics found in real IT networks, there are now a number of commercially available management platforms which have an auto-discovery function (see, for example, H. G. Hegering et al.: Integrated Management of Networked Systems, Morgan Kaufmann Publishers, 1999, pp. 329-331). Sometimes, the term "auto-discovery" is used in a strict sense in which it refers only to the function of becoming aware of new network elements (as far as they are discoverable), but does not include finding out how a new network element is connected to the other network elements, which is then the task of an "autotopology" function. However, in the present disclosure the term auto-discovery is used in a broader sense which encompasses auto-discovery (in the strict sense) and autotopology functions.

An example of a management platform which has an auto-discovery tool is the OpenView platform by Hewlett-Packard (see, for example, John Blommers "OpenView Network Node Manager", Prentice Hall PTR, 2001, pp. 61-78). U.S. 2004/0186903 A1, assigned to Hewlett-Packard Development Company LP, describes in paragraphs [0025]-[0027] details of how such an auto-discovery function (there called "collection") may work. An auto-discovery function may run on a scheduled basis; it then delivers, again-and-again, an updated representation of that part of the network, called "management domain", to which it is applied.

The result of an auto-discovery is a logical representation of the network (to the extent that it is discoverable). The logical representation is normally an instance of a database, also called a snapshot. Typically, the database uses the relational data model in which, for example, the network elements discovered are tuples of a relation, and their interconnections are included in attributes indicating to which other tuple, or another tuple's attribute, the tuple considered is linked. An example of a representation of an auto-discovered network using the relational data model is described in the above-mentioned document U.S. 2004/0186903 A1. The result of an auto-discovery is often visualized in the form of a network map. Such a map shows the network elements discovered and the network topology, i.e. how the network elements discovered are connected (see Blommers, page 4). An example of a network map is shown in U.S. 2002/0054300 A1 (also assigned to Hewlett-Packard Development Company LP) in FIGS. 1-4.

Normally, only those network elements are automatically discoverable which are able to respond to requests from other devices, for example, SNMP requests which typically originate from a network-management station and are directed to a management-IP address of the device considered. Due to the existence of an IP address and the traces left in routing or switching tables of other network devices by the communication to and from this IP address, the network device considered and its connection topology to other network devices can be automatically discovered. Such discoverable network elements will be also referred to as "active elements" herein, due to their ability to respond to requests, or even send unsolicited messages (e.g. so-called "SNMP traps").

However, a network also usually has a lot of elements which are not automatically discoverable, such as transmission media (e.g. cables or fiber optics), patchpanels, repeaters, hubs, and sometimes even "dumb" switches (a dumb switch is a non-manageable switch without an IP address; such switches are rarely used today). Since such non-discoverable elements usually only transport or forward signals at a physical layer, but cannot respond to requests or the like, they will be referred to as "passive elements" herein (dumb switches do not only forward signals, but handle data frames in a store-and-forward manner; however, since they are transparent, due to their inability to be managed, they are also considered as "passive elements").

In order to be able to record, display and administer the passive-element infrastructure, physical-inventory documentation systems are used, for example, cable management tools which maintain information about cabling systems and connections, including geographical information which describe the locations at which cables, cabling components, etc. are situated (see, for example, Hegering, pp. 361-371). Typically cable management systems are isolated tools although it has been proposed, e.g. by Hegering, that the information from different management functionalities is integrated in a common data model, for instance, via the provision of an "Export-Import API"—see Hegering, p. 369, Fig. 14.7.

SUMMARY OF THE INVENTION

A method is provided of creating an IT-network representation including automatically discoverable active elements and passive elements that are not automatically discoverable.

The method comprises producing, by running a network auto-discovery tool, a logical discoverable-elements representation of the IT network which includes the automatically discoverable active elements and a discoverable-elements network topology; and manually inserting, by a user by means of a network-element editor, representations of non automatically discoverable elements between automatically discovered elements into said discoverable-elements representation, thereby creating a combined logical representation which models the IT network with its automatically discoverable elements and not automatically discoverable elements.

According to another aspect, a computer program product is provided which is either in the form of a machine-readable medium with program code stored on it, or in the form of a propagated signal comprising a representation of program code. The program code is arranged to enable a user to carry out a method, when executed on a computer system, of extending a discoverable-elements IT-network representation by passive, that is not automatically discoverable, elements. The method comprises using the logical discoverable-elements representation which includes automatically discoverable active elements and a discoverable-elements topology, produced by running a network auto-discovery tool; and manually inserting, by means of a network-element editor, representations of non automatically discoverable elements between automatically discovered elements into said discoverable-elements representation, thereby creating a combined logical representation which models the IT network with its automatically discoverable elements and non automatically discoverable elements.

According to another aspect, a method is provided of performing fault diagnosis in an IT network having automatically discoverable active elements at routing- and switching-layers and not automatically discoverable passive elements at a physical layer. The method comprises using a combined logical representation of the IT network produced by running an auto-discovery tool and by inserting, into a representation automatically obtained by the auto-discovery tool, not automatically discoverable passive elements between automatically discovered elements, said combined logical representation modeling the IT network with its automatically discoverable active elements and not automatically discoverable passive elements; locating a fault down to the switching layer in response to a fault detection; and indicating, as a result of the fault-diagnosis method, possible physical-layer elements responsible for the fault, based on the known fault location at the switching layer and information from the combined logical IT-network representation which passive elements are located between routing- or switching-layer elements at the switching-layer fault location.

According to another aspect, a computer program product is provided which is either in the form of a machine-readable medium with program code stored on it, or in the form of a propagated signal comprising a representation of program code. The program code is arranged to carry out a method, when executed on a computer system, of performing fault diagnosis in an IT network having automatically discoverable active elements at routing- and switching-layers and not automatically discoverable passive elements at a physical layer. The method comprises using a combined logical representation of the IT network produced by running an auto-discovery tool and by inserting, into a representation automatically obtained by the auto-discovery tool, not automatically discoverable passive elements between automatically discovered elements, said combined logical representation modeling the IT network with its automatically discoverable active elements and not automatically discoverable passive elements; locating a fault down to the switching layer in response to a fault detection; and indicating, as a result of the fault-diagnosis method, possible physical-layer elements responsible for the fault, based on the known fault location at the switching layer and information from the combined logical IT-network representation which passive elements are located between routing- or switching-layer elements at the switching-layer fault location.

Other features of the methods and products disclosed herein will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 6 shows the relational database scheme derived from the Entity-Relationship diagram of FIG. 5;

FIG. 7A-7D show tables with instantiated tuples of the relational database scheme, according to embodiments of the invention;

FIG. 11 shows an incident report for a trouble ticket system, according to embodiments of the invention;

The drawings and the description of the drawings are of embodiments of the invention and not of the invention itself.

DESCRIPTION OF THE PREFERRED EMBODIMENTS

Figure 1:
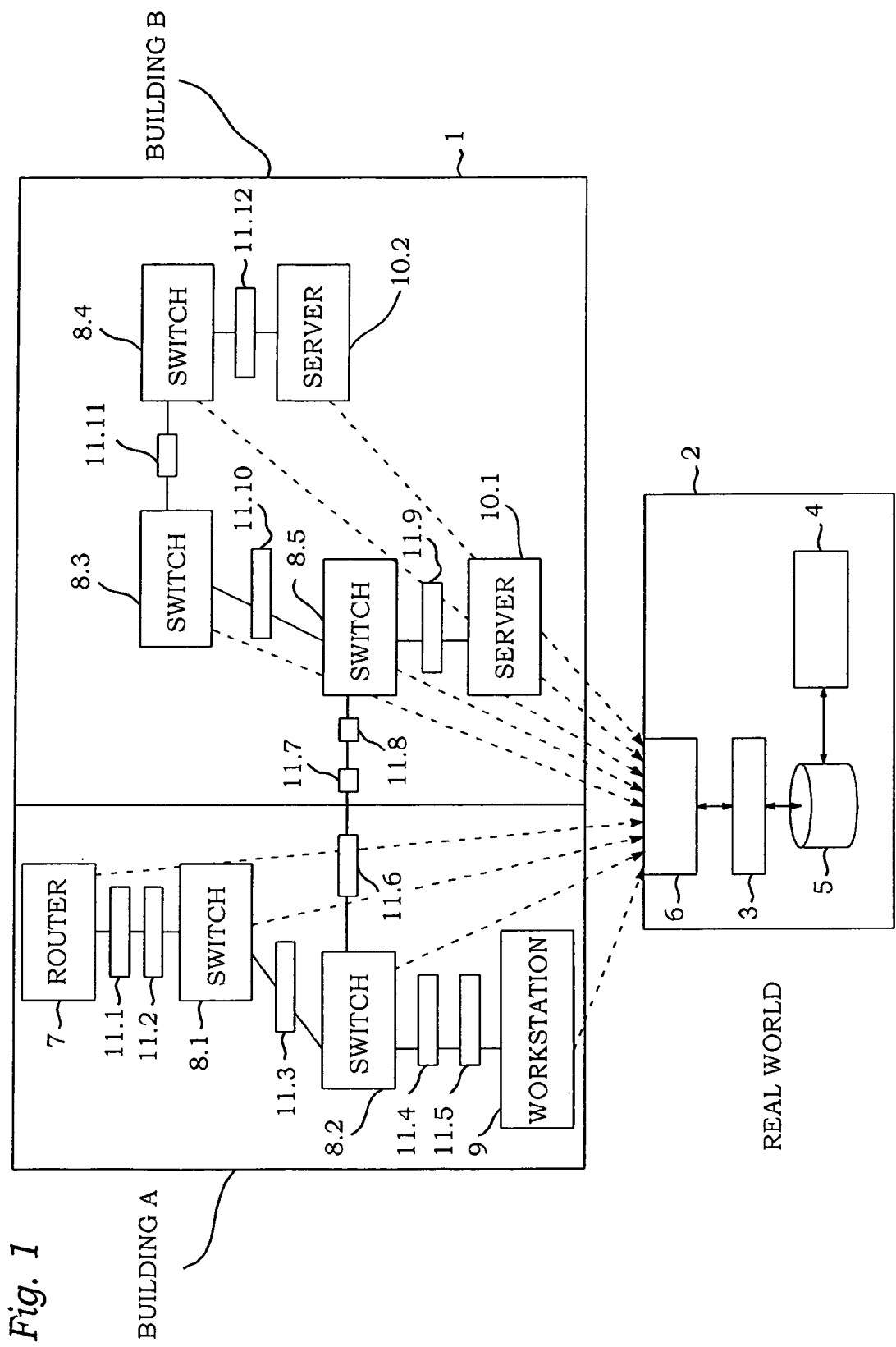
FIG. 1 illustrates an IT network which is managed by a network management station.

FIG. 1 shows a real-world view of an IT network in which passive, automatically non discoverable and active, auto-discoverable network elements and discovered connections between the elements are indicated. However, before proceeding further with the description of FIG. 1, a few items of the embodiments will be discussed.

The different interconnect devices of an IT network, such as cables, hubs, switches and routers, act on different layers of abstraction. In what is known as the OSI Reference Model communication within a network is based on a physical layer, a data link layer, a network layer and four further layers (see, for example, A. S. Tanenbaum: Computer Networks, 4$^{th}$ Edition, 2003, Pearson Education International, pp. 37-41). Another model, the TCP/IP Reference Model is based on similar layers, wherein the physical layer and the data link layer are called together "Host-to-network layer", and the network is called "Internet layer" (see, for example, Tanenbaum, pp. 41-49). A different terminology is used herein: the physical layer of the OSI Reference Model, or that part of the Host-to-network layer of the TCP/IP Reference Model corresponding to it, is called "physical layer", the data link layer of the OSI Reference Model, or that part of the Host-to-network layer of the TCP/IP reference model corresponding to it, is called "switching layer", and the network/Internet layer is called "routing layer".

As mentioned, the different interconnect devices operate at different layers. For example, switches and routers use different pieces of information to decide how to switch or route. In a typical scenario, an end device generates some data to be sent over the IT network to another end device. This data is passed to the routing layer within the first end device, where a routing layer header is added to the data to form a routing layer packet, for example, an IP packet. Then, still within the first end device, the packet goes to the switching layer, which adds its own header to the routing layer packet to form a switching layer frame and gives the frame to the physical layer for transmission over the network (see, for example, Tanenbaum, p. 326).

If one looks at the interconnect devices at the different layers, one finds transmission media (such as cables, fiber optics and/or radio channels), patchpanels, repeaters, and hubs, etc. at the bottom, at the physical layer. All these devices form a transparent part of a communication line, and are normally not "seen"—and thus not discovered—by an auto-discovery function (some type of hubs provide SNMP management capabilities and might therefore be discoverable, but those are no longer state of the art technology—SNMP was developed for the management, i.e. mainly the administration and monitoring, of network components; SNMP transmits and changes management information and alerts. A special SNMP management server can gather and evaluate this management information so that a network administrator keeps the overview over events in the network). A hub, for example, simply forwards all signals as they arrive (with a certain small and constant delay), and thus appears as a cable splitter. Consequently, collisions of frames on different sides of a hub are not excluded, so that all the transmission media and interfaces connected to a hub form a collision domain (a collision domain is also called a "segment" of a network).

If one moves up to the switching layer one finds switches and bridges as interconnect devices (switches and bridges are commonly referred to as "switches" hereinafter). Switches connect segments of a (sub-)network. When a frame arrives, software in the switch extracts the switching layer destination address from the frame header to see where to send the frame. For the Ethernet, this address includes the 48-bit-MAC address which is a hardware address uniquely identifying a device (see Tanenbaum, pp. 326-328). Switches work in a store-and-forward manner; i.e. they do not simply forward frames, but first store them and forward them only when no collision occurs. Switches therefore connect different collision domains, or segments. Typically, switches also have a routing layer address (e.g. an IP-address), although they do not use routing layer addresses (IP-addresses) in their switching decisions. This routing layer address is provided for management purposes and enables requests (such as SNMP or Ping requests) to be sent to a switch.

Moving up to the routing layer, one finds routers as interconnect devices. When a frame comes into a router, the routing layer packet is extracted from the frame and the routing layer address in the routing layer packet is used for deciding where to send it. For an IP packet, the packet header will contain a 32-bit (IPv4), or 128-bit (IPv6) IP address (see Tanenbaum, pp. 328 and 420-422). Routers connect different networks (or sub-networks, if one considers the connected networks as the "network").

In some of the embodiments, the IT network is a non-public (intranet) or public computer network (e.g. the Internet), but in other embodiments it is a telecommunication network (in other words, the term "IT network" used herein covers both computer and telecommunication networks). A computer network is (exemplarily, but not necessarily) a TCP/IP network. A typical computer IT network is a non-public LAN, but it may also comprise parts of a public network, such as the Internet. Such a computer IT network is typically divided into smaller sub-networks by the routers.

Besides interconnect devices, the IT networks of some of the embodiments also include machines for running application programs as well as input/output devices, such as servers, workstations, desktop computers, printers, etc., collectively referred to as end devices. Such end devices are typically addressable at the routing layer.

Since physical-layer elements, such as transmission media (cables/fiber optics/radio channels), patchpanels, repeaters and hubs, are transparent they cannot normally be discovered by an auto-discovery function. Switches are also transparent with respect to in- and outgoing data frames; however, since they normally have an IP address for management purposes, they can be found by the usual auto-discovery functions (except "dumb switches" without an IP address). Routers, by definition, have an IP address which, for example, appears in the routing tables of neighbor routers so that they can be found by auto-discovery tools in a straightforward manner (actually, since a router is a gateway between two or more (sub-)networks, it has at least two IP addresses).

The different network elements are herein also referred to as active and passive elements (in literature, one finds different definitions for active and passive network components, for example, that active network components are powered by electricity and passive network components are not. Another definition is that active components have their own logic which allows them to read the information which is added by the OSI layers). Herein, the term "active network element" is generically used for switches, bridges, and routers, whereas cables, patchpanels and patch cables etc. are considered as "passive network components". Moreover, active network components are generally accessible via SNMP due to their IP address. Hubs are normally non-discoverable, and are then considered as passive elements, but should a hub be discoverable (e.g. a hub with a management-IP address), it is considered as an active element.

In some of the embodiments, an auto-discovery function of a commercially available management platform is used, for example the OpenView platform by Hewlett-Packard (see, for example, John Blommers "OpenView Network Node Manager", Prentice Hall PTR, 2001, pp. 61-78), or an auto-discovery function described in U.S. 2004/0186903 A1, paragraphs [0025]-[0027]. Typically, the auto-discovery function uses TCP/IP and other parts of the TCP/IP protocol suite (such as Ping, Traceroute and SNMP; see, for example, W. Richard Stevens: TCP/IP Illustrated, Vol. 1, The Protocols, Addison-Wesley, 1994, pp. 85 to 110 and 359 to 388) to communicate with the (discoverable) network elements and to retrieve the required information from them. In order to discover changes or the disappearance of already-known network elements, the auto-discovery function sends requests to the known elements, for example, by using Ping, Traceroute or SNMP. In order to discover as yet unknown elements it can send trial echo requests (e.g. Ping requests) to possible IP addresses in a network. A new element with one of the IP addresses will respond to the (respective) echo request by disclosing information about its identity. Further router-related information can be obtained from ARP caches or routing tables in routers, which can be accessed by the discovery function, for example by means of the Simple Network Management Protocol (SNMP). The discovery of switches may be based on, for example, hardware (MAC) addresses stored in switches indicating to which other network elements data frames have been forwarded in the recent past. This information may also be obtained by SNMP. The data thus obtained also includes "neighborhood" information of the network elements discovered which enables the auto-discovery function to reconstruct the network topology.

Typically, an auto-discovery is carried out in three phases, scanning, exploration, and topology resolution (i) scanning aims to discover the existence of interconnect devices and end devices; (ii) exploration refers to the discovery of configuration and capabilities of scanned devices; and (iii) during topology resolution, the way the explored devices are connected (at the switching at routing layers) is ascertained.

Typically, the auto-discovery function runs on a scheduled basis; consequently, it delivers, again-and-again, an updated representation of that part of the network, called "management domain", to which it is applied. The result of an auto-discovery is a logical representation of the network (as far as it is discoverable). The logical representation is normally an instance of a database, also called a snapshot. Typically, the database uses the relational data model in which, for example, the network elements discovered are tuples of a relation, and their interconnections are included in attributes indicating to which other tuple, or another tuple's attribute, the tuple considered is linked (see, for example, Ramez Elmasri et al.: Fundamentals of Database Systems, Addison-Wesley, $3^{rd}$ edition, 1999, pp. 195 to 206). An example of a representation of an auto-discovered network using the relational data model is described in the above-mentioned document U.S. 2004/0186903 A1.

As mentioned above, a usual auto-discovery function is not only able to discover the presence or absence of network elements, but can also find out the network topology, i.e. whether two network elements are directly connected with each other. However, apart from discovering the fact that there is a connection, the auto-discovery function cannot find out the type of transmission media (cable, fiber optic, radio channel), or whether other physical-layer elements (patchpanels, repeaters, hubs etc.) are in the transmission path, let alone technical details about the transmission media and other physical-layer elements, or where the transmission media and the other physical-layer elements are located, etc.

In some of the embodiments, a representation of the IT-network is created which includes not only the automatically discoverable active elements, but also passive elements, which are not automatically discoverable. To this end, a logical representation of automatically discoverable elements of the IT network is first produced by running a network auto-discovery function; this logical representation is, in some embodiments, an instance of a relational database which includes the automatically discoverable elements and the network topology of the automatically discoverable elements, i.e. the connections between the automatically discoverable elements. Then, in some of the embodiments, a user is able to manually insert representations of not automatically discoverable passive elements between the automatically discovered elements into the discoverable-elements representation by means of a network-element editor. In this way, a combined logical representation is created which models the IT-network with its automatically discoverable elements and not automatically discoverable elements. For example, in a logical representation in the form of a relational database scheme manually inserted passive elements, and their configuration data, are linked with the automatically detected active components. The network-element editor is, or comprises, a man-machine interface enabling a user to specify what passive elements are to be inserted into the logical representation automatically produced by the auto-discovery function, and where they are to be inserted into the logical representation.

In some of the embodiments, the insertion of the passive elements between automatically discovered elements by means of the network-element editor results in logically linking the inserted passive elements with the automatically discovered elements. The discovered topology of the discoverable-elements representation provides connection points to which a passive element to be inserted can be logically linked. A connection point provided by the topology of the discoverable-elements representation is, for example, a point at a discovered network element which the auto-discovery function found to be connected to another discovered network element. A passive element may also be logically linked to another already-inserted passive element. When a passive element is to be inserted between two other elements (insertion between "two" is usually, but not necessarily, the case), it will finally be logically linked to two connection points, or a connection point and another (passive), or two other passive elements.

Different embodiments enable the inserted passive elements to be specified at different levels of abstraction. For example, in some of the embodiments the (non-discoverable) structure of the physical-layer connection between automatically discovered routing- and switching-layer elements can be specified in a more abstract manner, for example by enabling the user to specify that hubs, repeaters, patchpanels, etc. and, between them, transmission media are present, and how these physical-layer elements are topologically connected, without a need to specify the elements in more detail.

In other embodiments more detailed information about the non-discoverable physical-layer elements, also called "configuration data", may be specified and associated with the physical-layer elements inserted into the logical representation. For example, the configuration data may indicate the media type (cable, fiber optics or radio channel, or even more detailed information, such as cable type, fiber optics types, radio channel type), connector type, location of the passive physical-layer element within a building, location within a room, location within a cabinet, cable tray used, and/or port numbers used, etc.

In some of the embodiments, the network element editor provides a collection of pre-defined data about different kinds of passive physical-layer elements which, in principle, might be inserted. These data are accessible by a user in the network-element editor. The provision of such a user-accessible collection of physical-layer element data facilitates the manual insertion of physical-layer elements into the automatically produced logical representation of the IT-network since the user may simply select the network element to be inserted from among the collection, thereby accessing and inserting data representing the predefined physical-layer elements. In some of the embodiments in which configuration data can be associated with the inserted physical-layer elements, the network-element editor is also arranged to enable data representing pre-defined physical-layer element configurations to be accessed and inserted.

The combined logical representation is, in some embodiments, an instance of an extended relational database of which the initial automatically produced instance is a fragment.

Whenever the auto-discovery function has detected a change in the automatically-discoverable layer of the network (e.g. appearance or disappearance of network elements, or topology changes), the logical representation of the automatically-producible fragment of the database is correspondingly automatically updated to represent the new situation. The manually entered representation of passive components, and their configuration data, is thereby maintained, as far as it is not influenced by a detected change. However, for newly detected connections etc. the representation of the non-discoverable layer has to be updated manually, e.g. by means of the network-element editor, to maintain consistency of the combined data representation with the network in reality.

The combined logical representation can be used as a basis for different applications. For example, in some of the embodiments a graphical view of the IT-network (a "network map") is generated, on the basis of the combined logical representation, which also displays in the physical-layer elements the combined logical representation.

Another application used in some of the embodiments is fault diagnosis. There are known techniques, once a fault in an IT network has been detected, to locate this fault down to the switching layer. For example, such a fault-detection method which is used in some of the embodiments is described in U.S. 2004/0199627 A1. Typically, in a managed network, alert messages are produced if a network device, such as a switch or router becomes unavailable. For example, a managed switch or router may normally send "alive" messages (either asynchronously, i.e. without request, or synchronously, i.e. upon request of the management system). From the absence of such messages a failure of the device can be inferred. Furthermore, managed devices are often able to send messages asynchronously (i.e. SNMP traps) indicating a failure. However, in a network many devices are often interrelated, and if one device fails this may consequently have an impact on other devices such that these other devices also appear to be down. The detection of a fault is an unspecific symptom entailed, for example, by one of the following causes: (i) the monitored device is unavailable due to a fault of the monitored device itself; (ii) one or several interconnect devices have failed; or (iii) physical layer inventory such as cables, and patchpanels have failed. As a consequence of the impact of a fault on other devices, the management system will not only issue messages indicating that the device which has actually failed is down, but will also output a large number of related messages that other devices are not available either. Owing to the number of network devices and the complex interactions between them, it is generally difficult for an operator to resolve the dependencies of the generated messages and to find the origin of the problem.

In view of this, in some of the embodiments a fault is located down to the switching layer in response to a fault detection, using the procedure described in U.S. 2004/0199627. This fault-location method determines, before the occurrence of a fault, the path from the monitoring station to a monitored device considered (since monitoring is one of the typical tasks of a management system, the monitoring will typically be done by a management station—since we herein focus on the monitoring aspect of management, the term "monitoring station" etc. is also used herein). The method is based on sending echo requests, such as Ping or SNMP GET requests, to all routers and switches along the path determined, which is used by the frames representing the echo requests. Such an SNMP GET request may relate to a well known and always present SNMP MIB variable such as '1.3.6.1.2.1.1.2', 'sysObjectID', 'The vendor's authoritative identification of the network management subsystem . . . ', for example. If a router or switch is available, it will return a response to such a request to the monitoring station. If it is not available, it will typically return no response (or a response which indicates its non-availability). The last interconnect device on the path sending a response to the request and the first interconnect device which does not send a response indicate the sub-network and segment in which the fault is located. Therefore, by sending a sequence of such requests along the interconnecting path, the fault can be located down to the switching layer. In other words, the result of such a fault location is that either (a) a certain device (i.e. a certain router or a certain switch) is faulty; or (b) the segment before that device (seen from the monitoring station's perspective) is interrupted.

In some of the embodiments, as a result of the fault-diagnosis method, not only the potentially faulty device and the segment before that device are indicated, but also possible physical-layer elements responsible for the fault, as well as their configuration data, are indicated to the operator, for example, in a user-interface of the monitoring station. This is based on the known-fault location at the switching layer and information from the combined logical representation of the network which indicates what physical-layer elements are present between the routing- or switching-layer elements at the switching-layer fault location. Therefore, although the fault-location method does not locate the fault down to the physical layer, the operator will at least get information about the physical-layer elements in which the cause of the fault may be situated. The operator can then easily find, and check, all these physical-layer elements. The operator is also directly presented with the configuration data he/she needs to solve the problem instead of searching for the data needed, e.g. in various spreadsheets, separate cable management systems, etc.

In some embodiments the faults are reported in a trouble-ticket system. A "trouble-ticket" is a data set mainly containing fault-related information as well as information to lead staff to repair the fault, and to track the fault history, etc. (there are approaches to standardize the information structure of trouble-tickets and other aspects of trouble-ticket systems, for example in the ITU recommendation X.790, November 1995). In such a trouble-ticket system, a trouble-ticket is issued when a failure has been detected, in order to inform and guide the operator. In these embodiments, not only the router or switch, but also all physical-layer elements which are the possible cause of a fault are indicated on a trouble ticket associated with the fault.

For example, a trouble ticket is opened upon receipt of an incident report for a new network fault. An incident report may be automatically generated by the monitoring system and gives information about the root cause of the fault by indicating network elements potentially responsible for the fault and their configuration data, stored in the database system. As the same incident may occur several times, it is provided that multiple incident reports may refer to the same ticket. If the incident report refers to the network fault covered by an existing ticket, the incident report will be linked or attached to the existing ticket. A ticket is "owned" by the network administrator who is responsible for the resolution of the problem. A ticket is closed when the problem is resolved.

Tickets have a priority based on the urgency and scope of the fault. The higher the priority, the greater the need for expedient action. The ticket tracks the problem from its initial identification to its correction and closure. A trouble ticket might need to be reissued or reopened when, after a short period, the problem resurfaces or when the ticket should not have been closed.

Another application of the combined logical representation of discoverable and non-discoverable elements is in configuration checks. For example, in some of the embodiments a configuration check is performed in the IT network on the basis of the combined logical representation of the IT network, including checking whether the configuration of the passive elements in the combined logical IT-network representation is compliant with predefined configuration policies; and producing a configuration-check result, at least in response to finding a non-compliance of the passive-element configuration with a configuration policy. In some embodiments, the predefined configuration policies include a rule defining required passive-element redundancy, a rule defining cable paths or cabinets to be used, a rule defining combinations of cable paths or cabinets to be used, a rule defining permitted combinations of connector types, and/or a rule defining ports that may, or may not, be used. In some embodiments, some of the predefined configuration policies combine the routing- or switching-layer with the physical layer.

For example, a configuration rule may require that the cabling between two discoverable network devices must be redundant. A policy may monitor that this rule is preserved which means that if a cable is removed between these elements (and the combined data representation is manually updated to reflect this), and this removal infringes the redundancy rule, the operator is alerted. In some embodiments the configuration-check functionality may also be used in the context of network planning and development. For example, if a user wants to connect a further device to a patchpanel, s/he may first virtually connect the device in the combined logical representation; if this connections is not compliant with the configuration rules, an alert indicating this is triggered.

In a managed IT network, typically all, or at least many, of the management-addressable network devices are monitored by a monitoring station. However, for simplicity the figures illustrating fault analysis and their description focuses on the monitoring of only one device. The methodologies described in this context will be easily extended by the skilled reader to the monitoring of many devices, for example by sequentially applying the methodology of described single-element monitoring to other elements.

Some of the embodiments of the computer program product with program code for performing the described methods include any machine-readable medium that is capable of storing or encoding the program code. The term "machine-readable medium" shall accordingly be taken to include, for example, solid state memories and, removable and non removable, optical and magnetic storage media. In other embodiments, the computer program product is in the form of a propagated signal comprising a representation of the program code, which is increasingly becoming the usual way to distribute software. The signal is, for example, carried on an electromagnetic wave, e.g. transmitted over a copper cable or through the air, or a light wave transmitted through an optical fiber. The program code may be machine code or another code which can be converted into machine code, such as source code in a multi-purpose programming language, e.g. C, C++, Java, C#, etc. The embodiments of a computer system may be commercially available general-purpose computers programmed with the program code.

Returning now to FIG. 1 which shows a real-world representation of an IT network 1, which is spread over two buildings A and B and which is managed by a network management station 2. In building A, there are four active auto-discoverable network elements such as a router 7, two switches 8.1 and 8.2 and a workstation 9. The interconnections between these active network elements are cables (not depicted) and patchpanels 11 which belong to the physical layer inventory and are not auto-discoverable. Between router 7 and switch 8.1, there are two patchpanels 11.1 and 11.2. Between switch 8.1 and switch 8.2, there is one patchpanel 11.3, and between switch 8.2 and workstation 9, there are two patchpanels 11.4 and 11.5. It should be mentioned that, for the sake of clearness, not all passive elements belonging to the physical layer are depicted in this representation of the IT network. For example, in each patchpanel 11, there are plurality of patchcables which are not indicated in this representation.

In building B, there are also several active network elements, such as two servers 10.1 and 10.2. Furthermore, there are three switches 8.3, 8.4 and 8.5. Between the active network elements, there are patchpanels 11.9, 11.10 and 11.11 which physically implement the connections between the active network elements. Between the two buildings, there is physical connection which includes three patchpanels 11.6, 11.7 and 11.8.

All auto-discoverable network elements are connected via SNMP requests (indicated as dashed lines) to an SNMP manager 6 which collects configuration data from the auto-discoverable network elements and forwards them to an auto-discovery tool 3, which integrates the collected data into a database system 5 based on a relational data model. Furthermore, a network-element editor 4 is provided which enables a user to manually insert data pertaining to the passive network elements of the IT network 1 into the relational data model to obtain a combined logical representation of the IT network 1.

Figure 2:
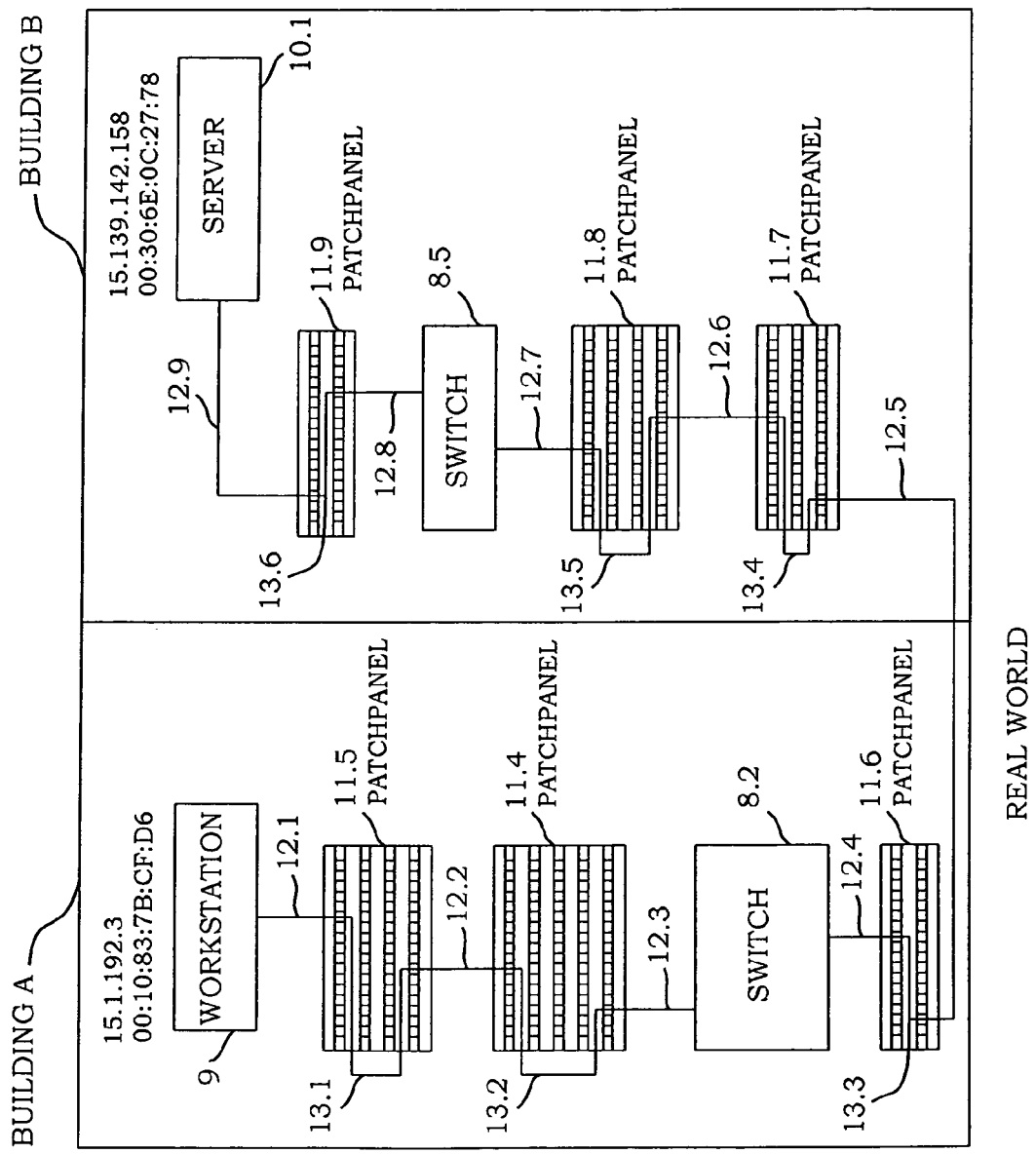
FIG. 2 shows physical layer inventory between a workstation and a server of the IT network.

FIG. 2 illustrates a more detailed real-world view upon the physical implementation of the auto-discoverable connections between the workstation 9, the switches 8.2 and 8.5, and the server 10.1 shown in FIG. 1. The physical layer inventory of these auto-discoverable connections is completely shown. If workstation 9 in building A sends a message to server 10.1 in building B, then the message is transmitted via the following physical connection:

Between the workstation 9 and the switch 8.2, there are two patchpanels 11.5 and 11.4 in which patchcables 13.1 and 13.2 connect two ports, respectively. The patchpanels 11.5 and 11.4 are connected among each other by means of a cable 12.2 and patchpanel 11.4 is connected by a cable 12.3 to the switch 8.2, which, in turn, is connected to patchpanel 11.6. A campus connection cable 12.5 is installed between patchpanel 11.6 and patchpanel 11.7, which connects the network elements in the two buildings, and a cable 12.6 is laid from patchpanel 11.7 to patchpanel 11.8. From patchpanel 11.8, a cable 12.7 is laid to switch 8.5, from where a cable 12.8 is laid to patchpanel 11.9. Finally, a cable 12.9 is laid from patchpanel 11.9 to the server 10.1.

Figure 3:
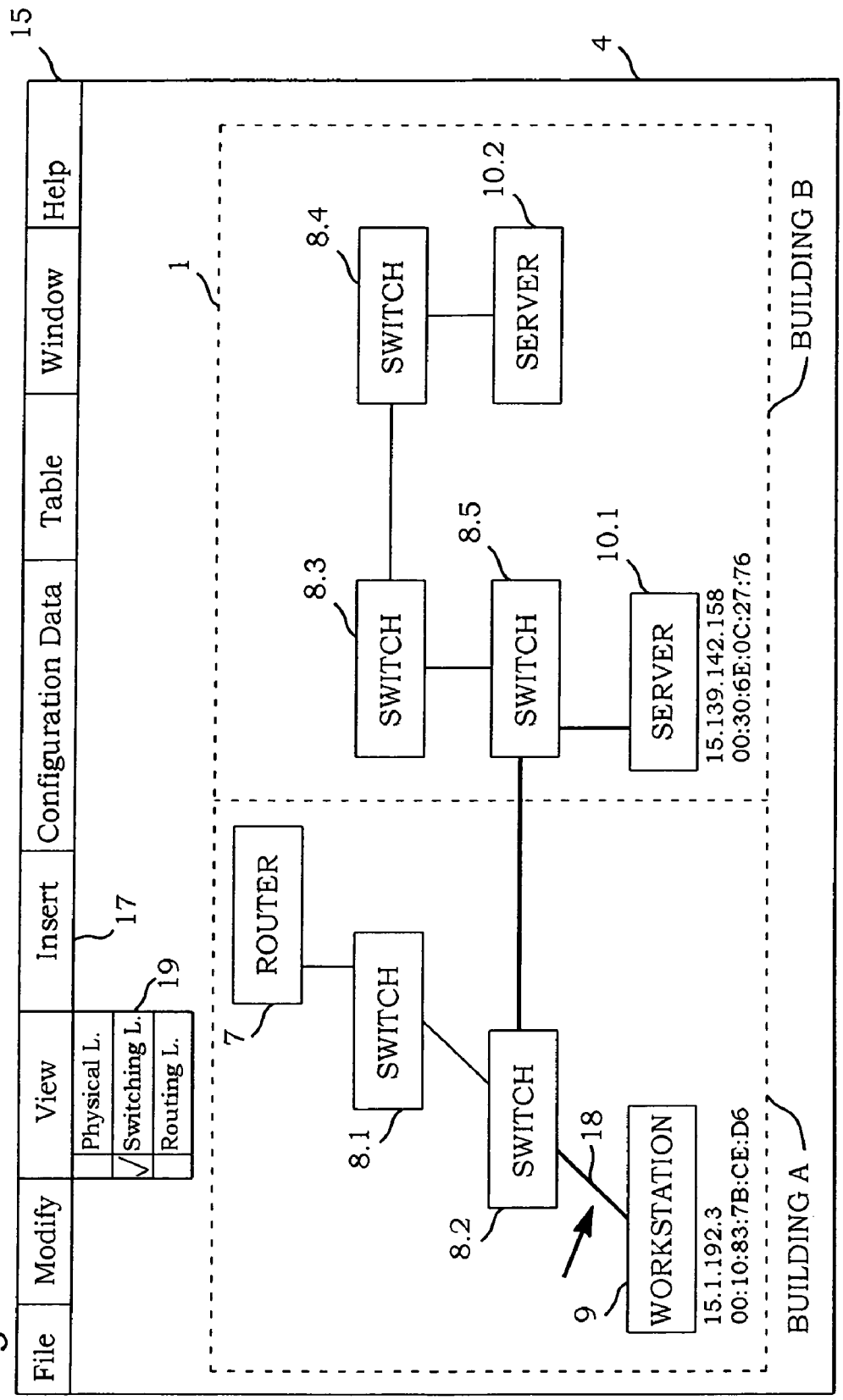
FIG. 3 shows a network-element editor, in which auto-discovered network elements including their topology are displayed.

FIG. 3 shows the IT network 1 as displayed in the network-element editor 4. The network-element editor 4 provides a feature "View" 19 by means of which a user selects in which layer representation s/he wishes the IT network 1 to be displayed. The user may select one of the icons "physical layer", "switching layer" and "routing layer" to choose a view upon the IT network 1. If the user selects the icon "routing layer", only the routers and the end devices (servers 10 and workstation 9) and auto-discoverable connections between them are displayed. This view can be obtained simply by means of the auto-discovery tool 3 since all network elements of the routing layer are auto-discoverable. If the user selects the icon "switching layer", then routers, switches and end devices are displayed in the view. Also this view may be obtained by means of the auto-discovery tool 3 which also includes an auto-topology function to identify connections between switches 8. However, the physical implementation of the connections are not displayed in this view since it includes network elements which are not auto-discoverable. A view of the physical layer is obtained if the user clicks on the "physical layer" icon. However, to obtain this view, a user has to manually insert beforehand via the menu "Insert" 17 the buildup of the IT network 1 in terms of physical network elements, such as cables, patchpanels etc., which are not auto-discoverable.

FIG. 3 shows the IT network 1 in the switching layer view in which only auto-discoverable network elements are displayed. The router 7 has been discovered to which the switch 8.1 is connected, which, in turn, is connected to the switch 8.2. The workstation 9 is connected to one of the ports of the switch 8.2. The switch 8.2 is connected to switch 8.5, which is connected to the server 10.1. Furthermore, the auto-discovery tool 3 further established that switch 8.3 is also connected to switch 8.5. Switch 8.4 is connected to switch 8.3 and the server 10.2 is connected to the switch 8.4. The auto-discovery tool 3 also established that the router 7, switch 8.1, switch 8.2 and workstation 9 are located in building A, whereas the other network elements are located in building B. This information is obtained by MIBs within the active network elements in which the location of the individual network elements is deposited. By means of the auto-discovery tool 3, it is established that there are connections between the individual network elements, which may be determined by topology-discovery algorithms. However, the auto-discovery tool 3 is unable to establish how the logical connections between the discovered network elements are physically laid out. This is due to the fact that cables, patchpanels, patchcables and other network elements belonging to the physical layer inventory do not have a management address by means of which such information could be requested. The connections between workstation 9, switch 8.2, switch 8.5 and server 10.1, whose physical layer inventory is shown in FIG. 2, is indicated as a bold line.

Figure 4:
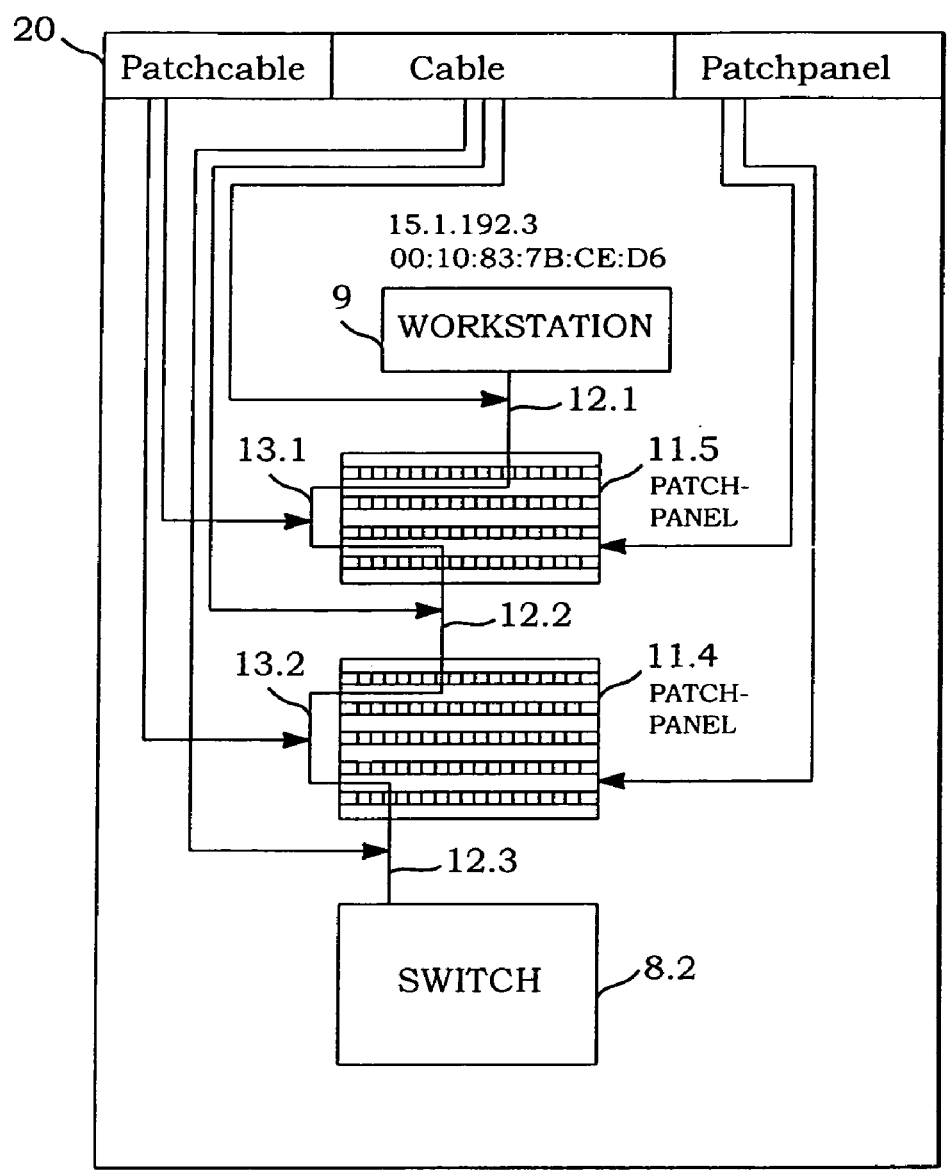
FIG. 4 illustrates a feature of the network-element editor by means of which passive network elements are manually added to auto-discovered network elements, according to embodiments of the invention.

By first clicking, with a mouse pointer, on menu "Insert" 17 and then on segment 18 in the network-element editor 4, a new menu pops up in which a user is enabled to complete the segment 18 with passive network elements belonging to the physical layer inventory. FIG. 4 illustrates this editor view. Initially, only the auto-discovered workstation 9 and the switch 8.2 is shown. A menu 20 is provided by means of which a user selects different passive network elements which s/he wishes to add between the active auto-discovered network elements. As shown in FIG. 4, the user has pulled—by means of a drag & drop function—some passive network elements (such as two patchpanels 11.5, 11.4, two patchcables 13.2, 13.1 and three cables 12.1, 12.2, 12.3) belonging to the physical layer inventory between the automatically discovered network elements and has thereby modeled the physical layer inventory of the segment 18. By selecting passive network elements and inserting them between the auto-discovered network elements, the selected passive network elements are added to the relational data-model and logical connections are automatically established between the auto-discovered network elements and the passive manually inserted network elements in the data-model. After the user has inserted this information manually, s/he is enabled to not only view the IT network 1 in the switching and routing layer view but also in the physical layer view by means of selecting the "physical layer view" within the menu "View" 19, as shown in FIG. 3.

Furthermore, it should be mentioned that in FIG. 3 a menu "CONFIGURATION DATA" is provided. A user may first click on a network element (active or passive) and may then click on the menu "CONFIGURATION DATA". Then, a menu pops up and the user is enabled to manually insert configuration data which may relate to the selected network element. For example, a user is enabled to manually enter the location of network elements if this information is not stored in the MIBs of the auto-discoverable network elements. Another feature is to store a mapping between physical and logical ports of the individual network elements within the relational data model.

Figure 5:
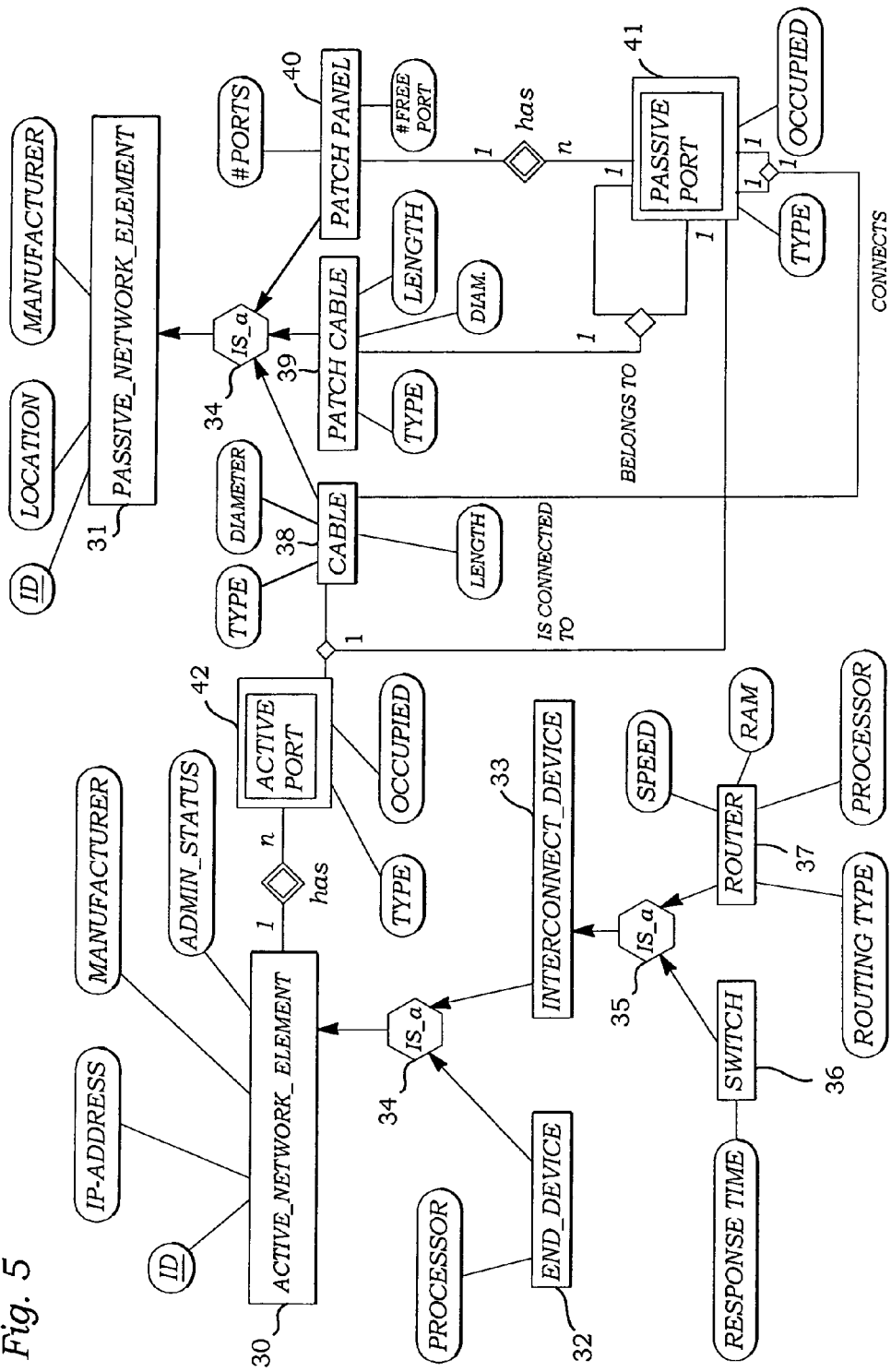
FIG. 5 shows an exemplary Entity-Relationship diagram for modeling a relational database scheme for storing data gathered by an auto-discovery function and manually entered data, according to embodiments of the invention.

FIG. 5 shows an exemplary Entity-Relationship diagram (ER-diagram) for modeling a relational database scheme for the auto-discovery tool 3 incorporating manually discovered network elements belonging to the physical layer. The Entity-Relationship model is the most commonly used data model for high-level descriptions of conceptual data models. Such data models are typically used in the first stage of database system design. The ER-diagram in FIG. 5 is divided into two major entities (indicated by rectangles). Entity "Active_Network_Element" 30 refers to those network elements which are automatically discovered and whose configuration data stored in MIBs is automatically entered into the database system 5. Entity "Passive_Network_Element" 31 refers to those network elements which are only manually discoverable and whose configuration data is manually entered via the network-element editor 4 into the database system 5. Entity "Active_Network_Element" 30 is further divided into entities "End_Device" 32 and entity "Interconnect_Device" 33. This dispartment is modeled by means of an "is_a"-relationship 34. Entity "Interconnect_Device" 33 is also split via an "is_a"-relationship 34 into entity "Switch" 36 and entity "Router" 37. The entities are endowed with attributes (indicated by ovals). Entity "Active_Network_Element" 30 has attributes "id", "IP-address", "manufacturer" and "admin_status", whereby "id" is a key attribute, which means that each database entry belonging to the entity "Active_Network_Element" 30 can be unambiguously identified by its id. The attribute "admin_status" indicates when the active element was auto-discovered for the last time. As the entities "End_Device" 32, "Interconnect_Device" 33, "Switch" 36 and "Router" 37 are hierarchically beneath "Active_Network_Element" 30 in terms of an "is_a"-relationship 34 they also possess the attributes of "Active_Network_Elements" 30 since attributes are inherited via an "is_a"-relationship 34. Entity "End_Device" 32 has additional attribute "processor", entity "Switch" 36 has additional attribute "response_time" and entity "Router" 37 has additional attributes "speed", "RAM", "processor" and "routing type". Entity "Passive_Network_Element" 31 with attributes "id", "location" and "manufacturer" is divided into entities "Cable" 38 with additional attributes "diameter", "type", "length", entity "Patchcable" 39 with additional attributes "diameter", "type", "length" and entity "Patchpanel" 40 with additional attributes "number of ports" and "number of free ports". Each patchpanel 11 necessarily has a number of ports. Therefore, entity "Passive_Port" 41 is modeled as a weak entity in connection with entity "Patchpanel" 40. Weak entity means that if a patchpanel is removed from the database system 5, then also its ports have to be removed since they are modeled as a weak entity. Weak entities are indicated by double-framed rectangles. Entity "Passive_Port" 41 has attributes "type" and "occupied". Two entities "Passive_Port" 41 stand in a (1:1:1)

relationship "belongs_to" with entity "Patchcable" 39. (1:1:1) relationship means that exactly one port and another port are connected via one patchcable. Entity "Cable" 38 stands in a (1:1:1)-relationship "connects" with two entities of "Passive_Port" 41. This relationship represents the cables between two patchpanels 11. Further, a (1:1:1)-relationship "is_connected_to" between an entity "Active_Port" 42, an entity "Passive_Port" 41 and an entity "Cable" 38 represents the cabling between a port of an active network element and a port of a patchpanel 11.

FIG. 6 shows the relational database scheme canonically derived from the ER-diagram of FIG. 5. This transformation is performed in accordance with a set of rules which are only referenced herein. Data types such as integer, string, float etc. are indicated right to the attributes of each relationship. Key attributes are underlined.

FIG. 7A-7D illustrate tables according to the relational database scheme of FIG. 6. The name of a table is equal to the relationship's name and columns of a table correspond to attributes. A line in a table is also called tuple and is an instantiation of an entity defined in the Entity-Relationship model. Relationships, such as "is_connected_to", "connects" and "belongs_to" also appear as tables and are used to join tables. The database system 5 can be queried by means of SQL (Structured Query Language). SQL is the most popular programming language used to create, modify and query database systems. If a user wants to know the manufacturers of cables connected to switch 8.2 (id of switch 8.2 is 10), s/he queries:

SELECT c.manufacturer
FROM Cable c, is_connected_to ict
WHERE ict.cable_id=c.id AND
ict.cable_id=10.

SQL can also be embedded in procedural or object-oriented programming languages such as C, C++ or Java.

Once an IT network has been modeled in terms of its routing layer, switching layer and physical in a common relational data model within a database system, this data model may also be used in combination with a diagnosis component to identify or characterize a network fault within an IT network. The following figures refer to such methodologies.

Figure 8:
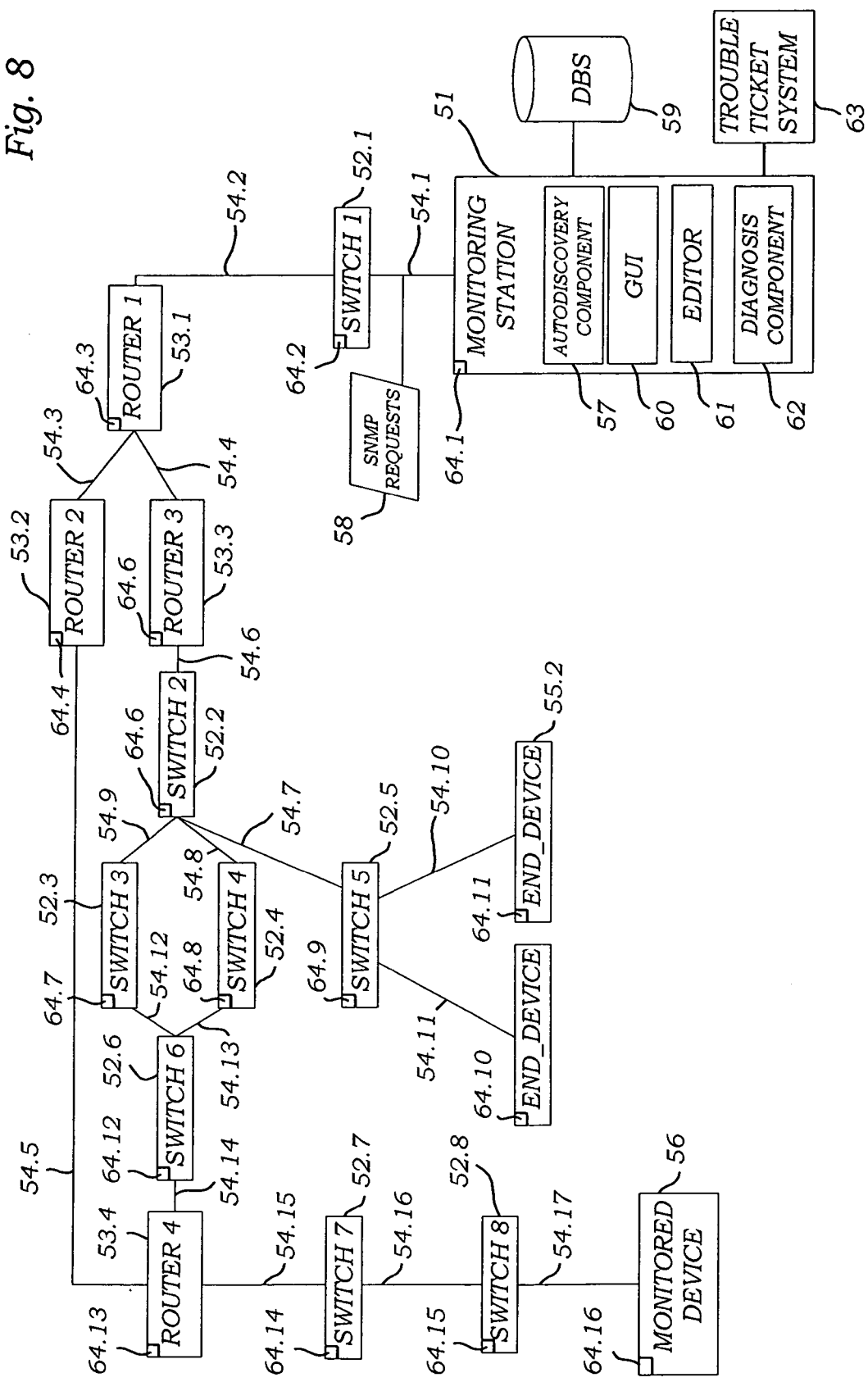
FIG. 8 shows a routing layer and switching layer representation of an exemplary embodiment of an IT network in which a monitoring station is arranged to carry out fault diagnosis of a monitored device.

FIG. 8 shows an IT network in which a monitoring station 51 controls a monitored device 56. The IT network is presented in a switching layer and routing layer representation which means that only network elements operating at these two layers are depicted. The network elements operating at these two layers are switches 52, operating at the switching layer and routers 53, operating at the routing layer. The monitoring station 51 includes an auto-discovery component 57, so that the monitoring station 51 has configuration data of active components of the entire IT network. The auto-discovery component 57 communicates with a database system 59 and automatically enters configuration data 64 found within active network elements, which are routers 53 and switches 52 in this embodiment, into the database system 59. The configuration data 64 is received in the monitoring station 51 by sending SNMP requests 58 to the individual active network elements. A graphical user interface 60 is also part of the monitoring station 51 and allows the viewing of the discovered network elements, their configuration data 64 and the network topology. The monitoring station 51 further includes a network-element editor 61 by means of which the automatically discovered configuration data 64 stored in the database system 59 is augmented by manually discovered data. In the depiction, the lines between the network elements symbolize network segments 54. A network segment 54 is a portion of a computer network separated by a network element. Such network elements might include repeaters, hubs, bridges, switches 52 and routers 53. Normally, a segment 54 is not an individual cable, but many cables, patchpanels and patchcables which are referred to as physical layer inventory. It is impossible to discover this physical layer inventory by the auto-discovery component 57 since network elements belonging to the physical layer inventory do not feature IP addresses and are therefore inaccessible by SNMP requests 58. The auto-discovery component 57 only infers that there is a connection between two active network components and displays a segment 54 in the form of a line between them but does not spot how a segment 54 is actually designed in terms of its physical layer inventory. In order to incorporate the detailed physical buildup of segments 54, a network-element editor 61 is provided which allows the user to enter configuration data of automatically undiscoverable passive network elements. The data entered via the network-element editor 61 is also stored in the database system 59 within the same relational database scheme as the configuration data of auto-discovered network elements.

The monitoring station 51 sends signals to the monitored device 56 on a regular basis and expects to receive response signals from it. If, however, the monitoring station 51 does not receive any response, it assumes that either the monitored device 56 or an interconnect device on a routing path between the monitoring station 51 and the monitored device 56 or a segment 54 on that path has broken. In order to localize the root cause of the network fault, a diagnosis component 62 running on the monitoring station 51 narrows down the root cause of the network fault. Before a fault occurs, the monitoring station 51 calculates on which router path the data packets are transmitted to the monitored device 56. The router path only consists of the routers (no other network devices) which forward the data packets to their destination sub-network. Then, if a network fault occurs, the monitoring station sends SNMP requests to the routers on the determined router path beginning with the router 53 closest to the monitoring station 51 and moving towards the monitored device 56. Normally, the situation occurs that one router 53 sends a response and the next router 53 on the determined path does not send a response. At this stage, the diagnosis component 62 has isolated the fault at the router 53 which has not responded and the segment 54 in the direction towards the router which has responded. This segment 54 is then examined in terms of switches 52 lying on this segment 54 and the network fault is further narrowed down.

Figure 9:
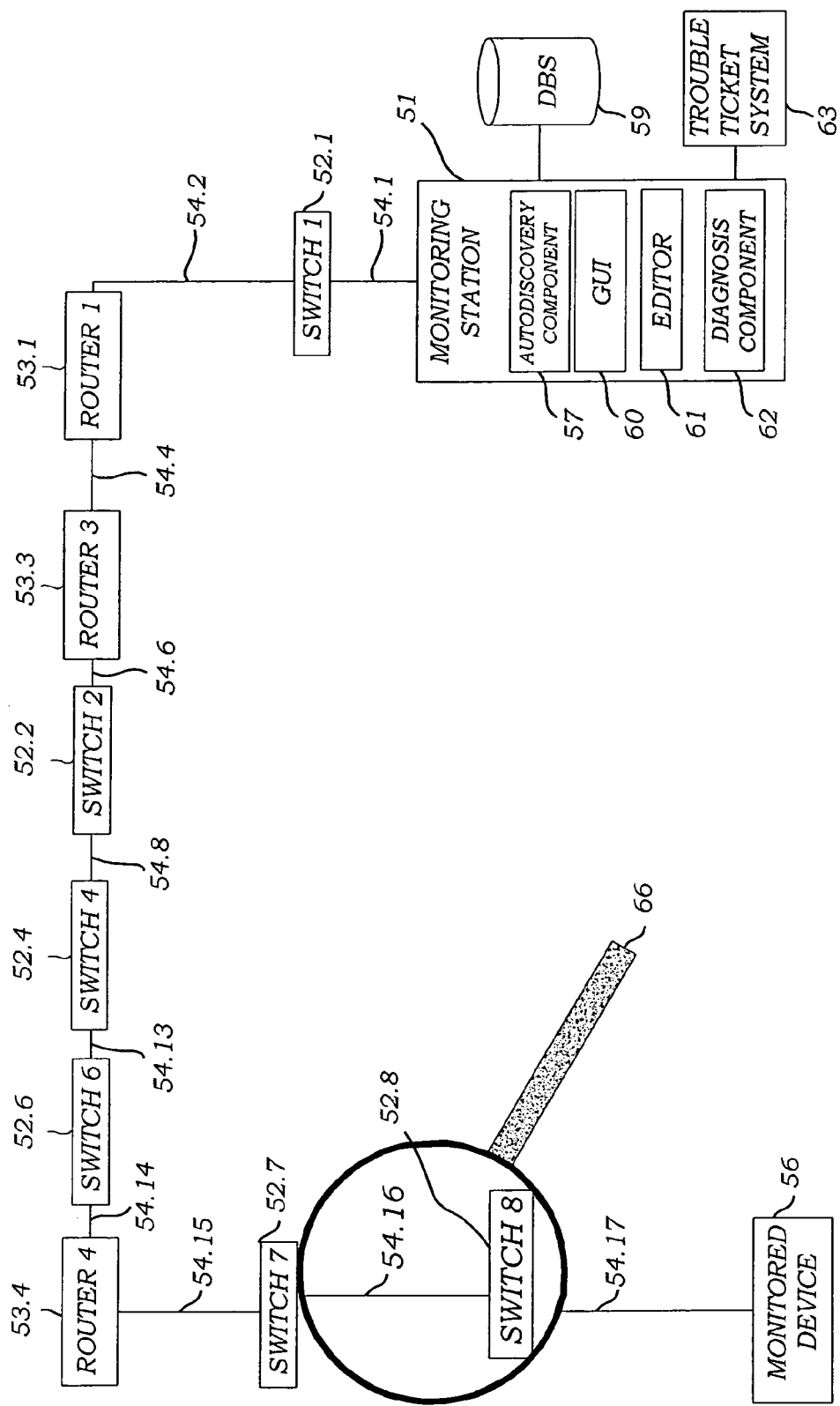
FIG. 9 shows how the root cause of a fault is narrowed down by a diagnosis system.

FIG. 9 shows a path on which data packets are transmitted from the monitoring station 51 to the monitored device 56. A network fault has occurred and the diagnosis component 62 figures out the root cause of the network fault. Router 53.4 sends a response to a Ping request, but the monitored device 56 does not give a response. Then, switches 52 are examined and it is found that switch 52.7 sends a response, whereas switch 52.8 does not. Therefore, the diagnosis component 62 infers that either switch 52.8 or the network segment 54.16 in front of switch 52.8 (with regard to the monitoring station 51) is the cause of the network fault. A magnifying glass 66 symbolizes that the segment 54.16 and the switch 52.8 will be presented in more detail in FIG. 10.

Figure 10:
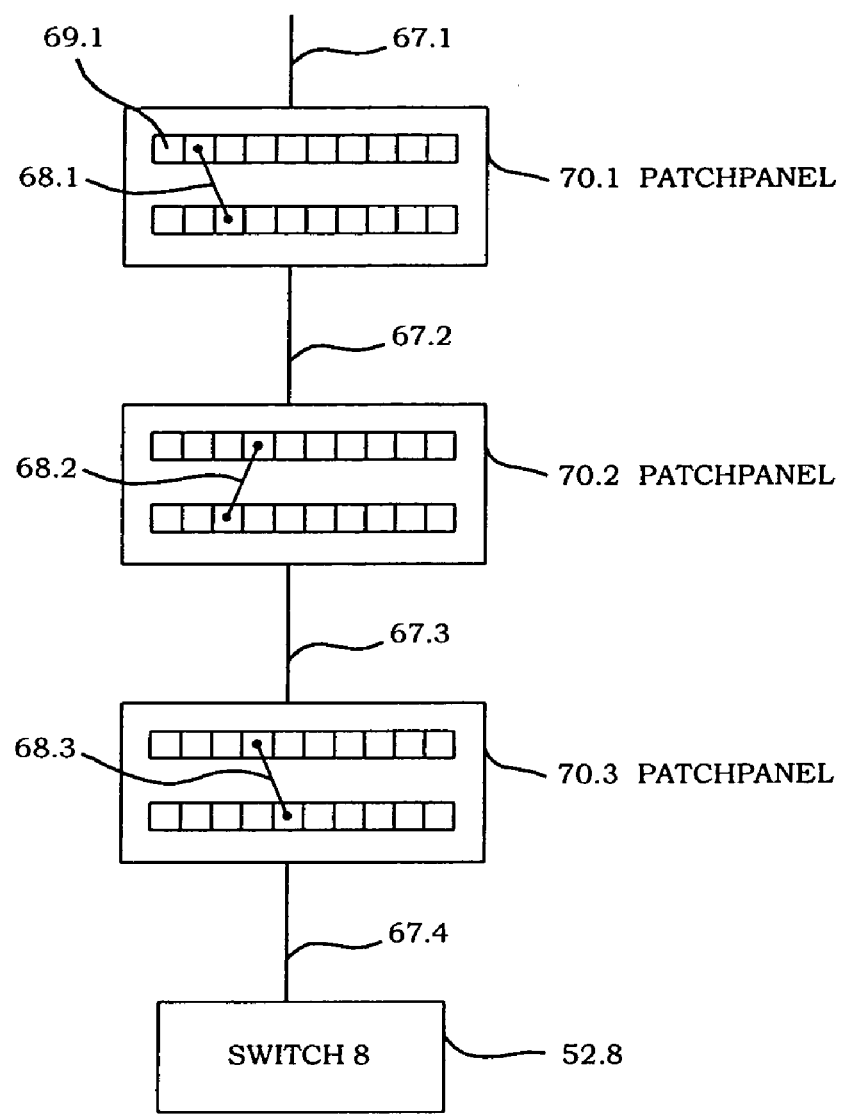
FIG. 10 shows a physical layer representation of the part of the network to which the fault has been narrowed down.

FIG. 10 illustrates the segment 54.16 and switch 52.8 in terms of physical layer inventory of the data transmission between switch 52.7 and switch 52.8 which is stored in the database system 59 based on the relational data model as shown in FIGS. 5 to 7. The segment 54.16 and switch 52.8 are the network elements in which the diagnosis component 62 has localized the root cause of the network fault. Switch 52.7 is connected via a cable 67.1 with patchpanel 70.1 which has ten incoming ports 69.1-69.10 and ten outgoing ports 69.11-69.20. Incoming port 69.2 is connected via patch cables 68.1 with outgoing port 69.13. Patchpanel 70.1 is connected via cable 67.2 with patchpanel 70.2 which, in turn, is connected with patchpanel 70.3 via cable 67.3. Patchpanel 70.3 is connected via cables 67.4 with switch 52.8. The configuration data 61.15 of the switch 52.8 is automatically discovered. Configuration data of patchpanels 70, cables 67, 71, 72, 73 and patchcables 69 not only of this part of the network but of the entire network is entered manually via an editor 61 into the database system 59 before a network fault is detected.

FIG. 11 shows an incident report for a trouble ticket system 63. The upper part of the incident report indicates on which occasion the network fault was detected. Then, it is stated which active and passive components are recommended to be checked in order to eliminate the root cause of the network fault. Configuration data of all network components suspected of causing the network fault are listed. This listing is yielded by a program with an SQL-interface which queries configuration data of active and passive network elements found in that part of the network which the diagnosis component 62 considers to be the root cause of the network fault. The SQL-statement which delivers the required information is verbalized as: "Output all attributes of all cables, patchpanels, patchcables and cables which are between switch 52.7 (exclusively) and switch 52.8 (inclusively)." A statement like this typically leads to recursive SQL-statements. As relational algebra, the mathematical foundation of SQL, does not support recursive SQL-statements, at least not in SQL standard SQL-92, it is resorted to producer specific language extensions of SQL or to embedded SQL. The incident reports are sent via e-mail to network administrators in charge of the network or parts thereof. Additionally, the incident reports relating to the same network fault are merged into one trouble ticket. After the network fault has been solved, the solution of the problem is noted on the trouble ticket so that network administrators may resort to the solution if the same network fault occurs a second time.

Figure 12:
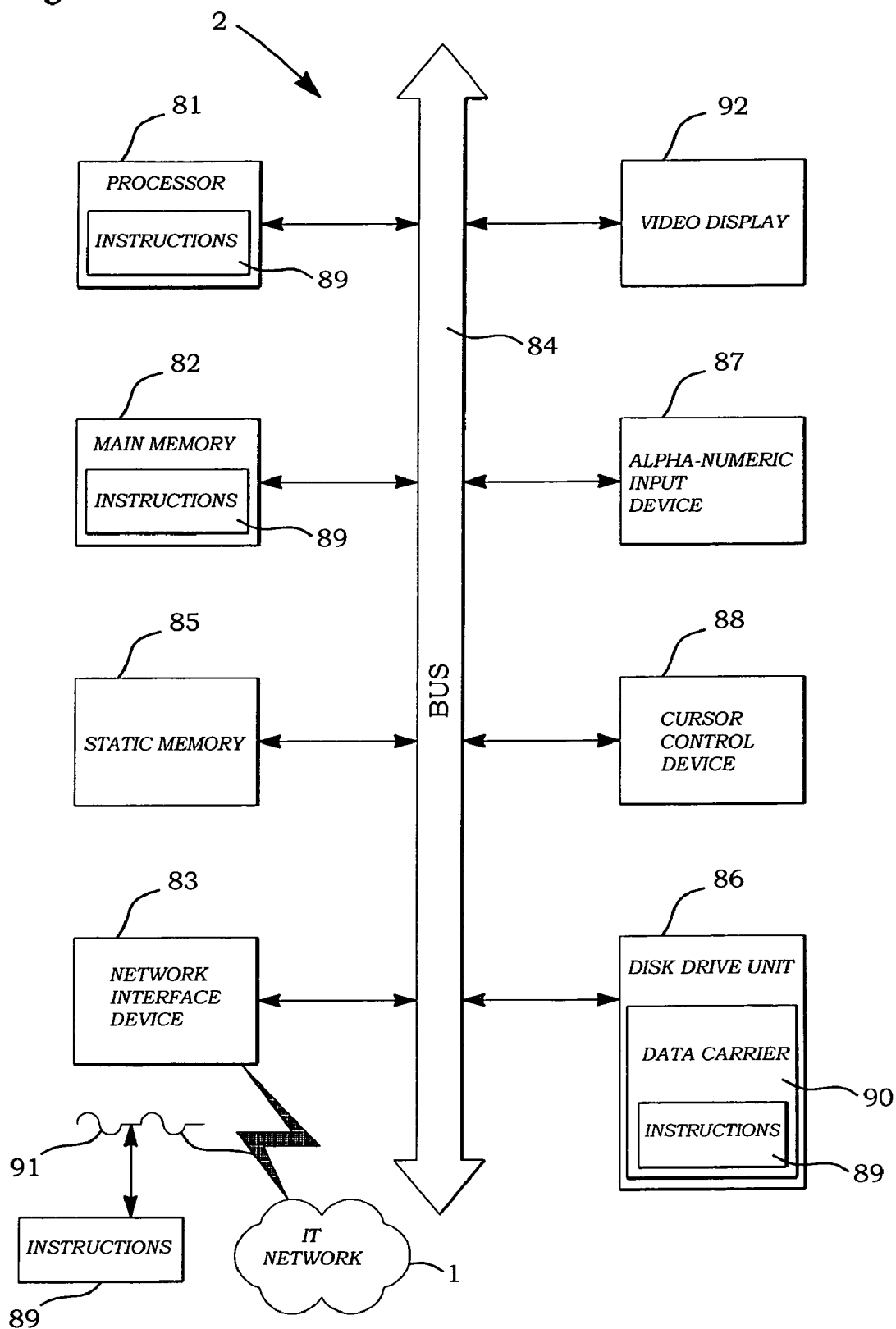
FIG. 12 is a diagrammatic representation of an exemplary embodiment of the network management station shown in FIG. 1.

FIG. 12 is a diagrammatic representation of a computer system which provides the functionality of the network management system 2 of FIG. 1, and is therefore denoted as "network management computer system 2". Within the network management computer system 2 a set of instructions, to cause the computer system to perform any of the methodologies discussed herein, may be executed. The network management computer system 2 includes a processor 81, a main memory 82 and a network interface device 83, which communicate with each other via a bus 84. Optionally, it may further include a static memory 85 and a disk drive unit 86. A video display (the monitoring GUI) 92, an alpha-numeric input device 87 and a cursor control device 88 may form a network management user interface. The network interface device 83 connects the network management computer system 2 to the managed IT network 1. A set of instructions (i.e. software) 89 embodying any one, or all, of the methodologies described above, resides completely, or at least partially, in or on a machine-readable medium, e.g. the main memory 82 and/or the processor 81. A machine-readable medium on which the software 89 resides may also be a data carrier 90 (e.g. a non-removable magnetic hard disk or an optical or magnetic removable disk) which is part of disk drive unit 86. The software 89 may further be transmitted or received as a propagated signal 91 via the Internet and the IT network 1 through the network interface device 83.

Thus, a general purpose of the disclosed embodiments is to provide methods and products which enable an integrated view upon different layer topologies of an IT network.

All publications and existing systems and methods mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of creating an Information Technology (IT)-network representation including automatically discoverable active elements and passive elements, comprising:

producing, by running a network auto-discovery tool, a logical discoverable-elements representation of the IT network which includes the automatically discoverable active elements and a discoverable-elements network topology;

manually inserting, by a user by means of a network-element editor, representations of passive elements between automatically discovered elements into said discoverable-elements representation, thereby creating a combined logical representation which models the IT network with its automatically discoverable elements and passive elements, wherein the passive elements are not addressable by a network address and not automatically discoverable by running the network auto-discovery tool.

2. The method of claim 1, wherein the insertion of the passive elements between automatically discovered elements by means of the network-element editor results in logically linking the inserted passive elements with the automatically discovered elements.

3. The method of claim 2, wherein the topology of the discoverable-elements representation provides connection points, and wherein an inserted passive element is logically linked to at least one of a connection point and another passive element.

4. The method of claim 1, wherein inserting passive elements comprises specifying at least one of a presence of a patch-panel, and a presence of a repeater between automatically discovered elements.

5. The method of claim 1, wherein inserting passive elements comprises specifying configuration data of the passive elements, comprising connector type, location within a building, location within a room, location within a cabinet, and cable duct used.

6. The method of claim 1, wherein the manual insertion of physical-layer elements by means of the network-element editor is aided by existing data about passive elements which are accessible in the network-element editor.

7. The method of claim 4, wherein the network-element editor is arranged to enable the insertion of passive elements by accessing predefined passive-element data.

8. The method of claim 5, wherein the network-element editor is arranged to enable specifying configuration data of the passive elements by accessing predefined passive-element configuration data.

9. The method of claim 1, wherein a graphical view of the IT network, including inserted passive elements, is generated on the basis of the combined logical representation of the IT network.

10. The method of claim 1, wherein a fault diagnosis is performed in the IT network in response to a fault detection on the basis of the combined logical representation of the IT network, the IT network including automatically discoverable elements at routing and switching layers and passive elements at a physical layer, comprising:
 locating a fault down to the switching layer in response to the fault detection;
 indicating passive physical-layer elements that are potentially responsible for the fault, based on the known fault location at the switching layer and information from the combined logical IT-network representation which represents passive elements located between routing- or switching-layer elements at the switching-layer fault location.

11. The method of claim 1, wherein faults are reported in a trouble-ticket system, and all passive elements which are the possible cause of a fault are indicated on a trouble ticket associated with the fault.

12. The method of claim 1, wherein a configuration check is performed in the IT network on the basis of the combined logical representation of the IT network, comprising:
 checking whether the configuration of the passive elements in the combined logical IT-network representation is compliant with predefined configuration policies;
 producing a configuration-check result, at least in response to finding a non-compliance of the passive-element configuration with a configuration policy.

13. The method of claim 12, wherein the predefined configuration policies comprise at least one of a rule defining required passive-element redundancy, a rule defining cable paths or cabinets to be used, a rule defining combinations of cable paths or cabinets to be used, a rule defining permitted combinations of connector types, and a rule defining ports that may, or may not, be used.

14. The method of claim 12, wherein the IT network includes automatically discoverable elements at routing and switching layers and passive elements at a physical layer, and wherein some of the predefined configuration policies combine the routing- or switching-layer with the physical layer.

15. A method of performing fault diagnosis in an IT network having passive elements at a physical layer and automatically discoverable active elements at routing- and switching-layers, comprising:
 using a combined logical representation of the IT network produced by (a) running an auto-discovery tool and obtaining a representation of automatically discoverable elements from the auto-discovery tool and by (b) inserting the passive elements into the representation between the automatically discovered elements, said combined logical representation modeling the IT network with its automatically discoverable active elements and passive elements that are not addressable by a network address and not automatically discoverable;
 locating a fault down to the switching layer in response to a fault detection;
 indicating, as a result of the fault-diagnosis method, possible physical-layer elements responsible for the fault, based on the known fault location at the switching layer and information from the combined logical IT-network representation which passive elements are located between routing- or switching-layer elements at the switching-layer fault location.

16. The method of claim 15, wherein faults are reported in a trouble-ticket system, and all passive elements which are the possible cause of a fault are indicated on a trouble ticket associated with the fault.

17. A computer program product in the form of a non-transitory machine-readable medium with program code stored on it comprising:
 wherein the program code is arranged to enable a user to carry out a method, when executed on a computer system, of extending a discoverable-elements IT-network representation by passive elements, said method comprising:
 using the logical discoverable-elements representation which includes automatically discoverable active elements and a discoverable-elements topology, produced by running a network auto-discovery tool;
 manually inserting, by means of a network-element editor, representations of not automatically discoverable elements between automatically discovered elements into said discoverable-elements representation, thereby creating a combined logical representation which models the IT network with its automatically discoverable elements and passive elements that are not addressable by a network address and not automatically discoverable.

18. A computer program product in the form of a non-transitory machine-readable medium with program code stored on it comprising:
 wherein the program code is arranged to carry out a method, when executed on a computer system, of performing fault diagnosis in an IT network having automatically discoverable active elements at routing- and switching-layers and passive elements at a physical layer, said method comprising:
 using a combined logical representation of the IT network produced by running an auto-discovery tool and by inserting, into a representation automatically obtained by the auto-discovery tool, passive elements between automatically discovered elements, said combined logical representation modeling the IT network with its automatically discoverable active elements and passive elements that are not addressable by a network address and not automatically discoverable;
 locating a fault down to the switching layer in response to a fault detection;
 indicating, as a result of the fault-diagnosis method, possible physical-layer elements responsible for the fault, based on the known fault location at the switching layer and information from the combined logical IT-network representation which passive elements are located between routing- or switching-layer elements at the switching-layer fault location.

19. The method of claim 15, wherein the physical-layer elements include at least one of a cable, patch panel and repeater, and the physical-layer elements are passive elements not discoverable by running the auto-discovery tool.

20. The program code of claim 18, wherein the physical-layer elements include a patch panel, and the physical-layer elements are passive elements not discoverable by running the auto-discovery tool.

* * * * *